United States Patent
Dillinger et al.

(10) Patent No.: US 10,557,298 B2
(45) Date of Patent: Feb. 11, 2020

(54) LOCKING APPARATUS FOR COVERING AND RELEASING A CHARGING INTERFACE OF A MOTOR VEHICLE AND MOTOR VEHICLE

(71) Applicant: AUDI AG, Ingolstadt (DE)

(72) Inventors: Andreas Dillinger, Kelheim (DE); Jaume Sanchez, Nassenfels (DE); Josef Burger, Seubersdorf (DE)

(73) Assignee: AUDI AG, Ingolstadt (DE)

(*) Notice: Subject to any disclaimer, the term of this patent is extended or adjusted under 35 U.S.C. 154(b) by 213 days.

(21) Appl. No.: 15/810,769

(22) Filed: Nov. 13, 2017

(65) Prior Publication Data

US 2018/0142512 A1 May 24, 2018

(30) Foreign Application Priority Data

Nov. 22, 2016 (DE) .................... 10 2016 223 010

(51) Int. Cl.
*B60K 15/05* (2006.01)
*B60L 53/16* (2019.01)
*E05F 15/63* (2015.01)

(52) U.S. Cl.
CPC .............. *E05F 15/63* (2015.01); *B60K 15/05* (2013.01); *B60L 53/16* (2019.02);
(Continued)

(58) Field of Classification Search
CPC . Y02T 90/14; Y02T 10/7005; Y02T 10/7072; B60L 53/16; E05F 15/63
See application file for complete search history.

(56) References Cited

U.S. PATENT DOCUMENTS

| | | | |
|---|---|---|---|
| 5,934,918 A * | 8/1999 | Wuechner | H01R 13/4532 439/133 |
| 6,234,555 B1 * | 5/2001 | Emmerich | B60K 15/04 220/86.2 |

(Continued)

FOREIGN PATENT DOCUMENTS

| | | |
|---|---|---|
| CN | 101652271 A | 2/2010 |
| CN | 201808607 U | 4/2011 |

(Continued)

OTHER PUBLICATIONS

German Examination Report dated Jul. 20, 2017 from corresponding German Application No. 10 2016 223 010.7 (7 pages).

(Continued)

*Primary Examiner* — Justin B Rephann
(74) *Attorney, Agent, or Firm* — Maier & Maier, PLLC

(57) ABSTRACT

A locking apparatus for covering and releasing a charging interface of a motor vehicle. The locking apparatus comprises a cover element, which is pivotable relative to the charging interface and which can be displaced between a closed position and an open position. The locking apparatus is equipped with a flexible connection element, which is rigidly connected to the cover element at one upper end region of the cover element in the direction of the vehicle along the transverse extent of the cover element. The cover element is at the same time permanently and in every position coupled by the connection element for protecting the charging interface with a part that is stationary relative to the charging interface.

8 Claims, 2 Drawing Sheets

Figure 3:
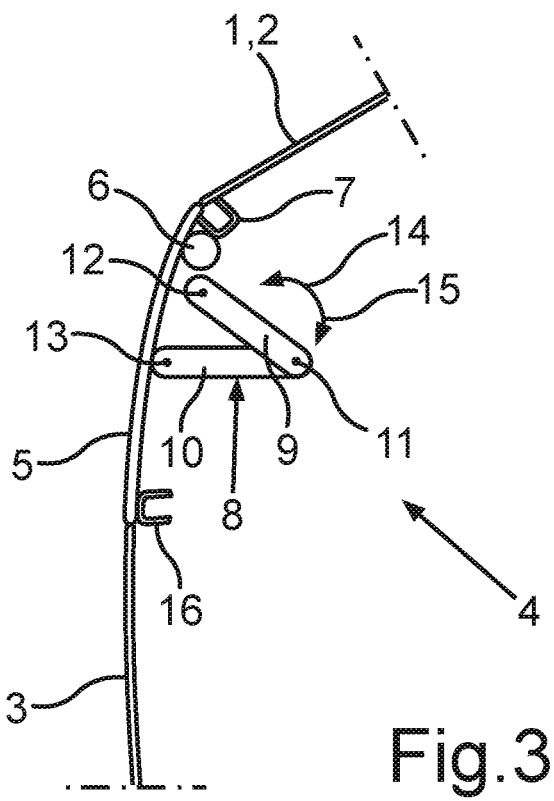

(52) U.S. Cl.
CPC ..... *E05Y 2900/534* (2013.01); *Y02T 10/7005* (2013.01); *Y02T 90/14* (2013.01)

(56) References Cited

U.S. PATENT DOCUMENTS

| | | | | |
|---|---|---|---|---|
| 8,740,283 B2* | 6/2014 | Yamamaru | ................ | E05D 7/04 296/136.01 |
| 10,052,947 B2* | 8/2018 | Herrmann | .............. | B60K 15/05 |
| 2010/0026238 A1* | 2/2010 | Suzuki | ................. | B60Q 1/2661 320/109 |
| 2010/0246198 A1* | 9/2010 | Hook | ................... | B60Q 1/2661 362/459 |
| 2011/0043355 A1* | 2/2011 | Chander | ................. | B60Q 9/00 340/455 |
| 2011/0227531 A1* | 9/2011 | Rajakaruna | ........... | B60L 3/0069 320/109 |
| 2012/0019206 A1* | 1/2012 | Sekido | ................ | B60L 11/1877 320/109 |
| 2012/0083148 A1* | 4/2012 | Hirashita | ........... | H01R 13/6275 439/304 |
| 2013/0143432 A1* | 6/2013 | Yamashita | .............. | B60L 1/006 439/503 |
| 2013/0153257 A1* | 6/2013 | Yamamaru | ........... | H01R 13/447 174/67 |
| 2013/0271079 A1* | 10/2013 | Tanneberger | ........... | B60L 53/00 320/109 |
| 2015/0048644 A1* | 2/2015 | Georgi | .................. | B60K 15/05 296/97.22 |
| 2015/0102627 A1* | 4/2015 | Pickartz | .............. | B60L 11/1818 296/97.22 |
| 2015/0151645 A1* | 6/2015 | Yamamaru | ............... | B60L 53/11 320/109 |
| 2015/0191093 A1* | 7/2015 | Yamamaru | ............... | B60L 50/66 320/109 |
| 2015/0197157 A1* | 7/2015 | Nakajima | ........... | B60L 11/1818 439/352 |

FOREIGN PATENT DOCUMENTS

| | | |
|---|---|---|
| CN | 103237678 A | 8/2013 |
| CN | 203826686 U | 9/2014 |
| DE | 2850470 A1 | 5/1980 |
| DE | 19642687 A1 | 4/1998 |
| DE | 29921802 U1 | 3/2000 |
| DE | 19832910 C2 | 3/2003 |
| DE | 102010053137 A1 | 6/2012 |
| DE | 102011006476 A1 | 10/2012 |
| DE | 102012021854 B3 | 3/2014 |
| FR | 2754644 A1 | 4/1998 |
| FR | 2972145 B1 | 4/2013 |
| FR | 2998102 A1 | 5/2014 |
| FR | 2998102 B1 | 12/2015 |
| JP | 2016088252 A | 5/2016 |

OTHER PUBLICATIONS

Office Action dated Sep. 4, 2019, in corresponding Chinese Application No. 201711165644.6; 15 pages.

* cited by examiner

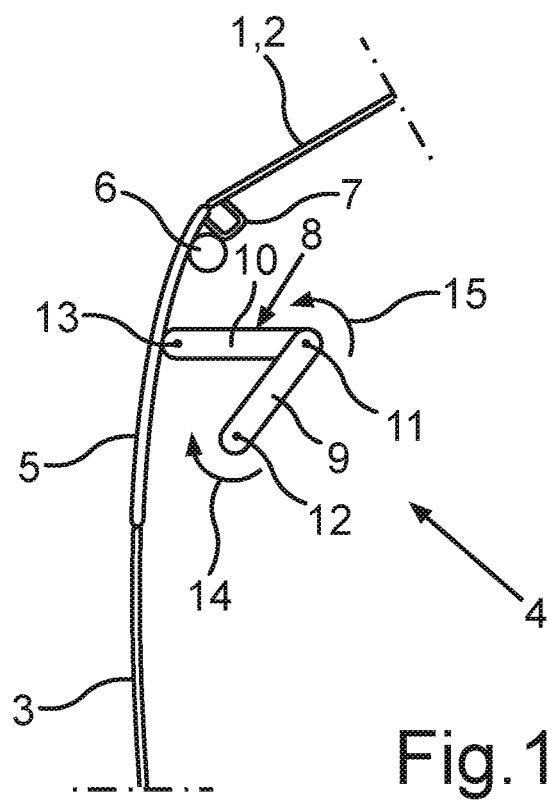
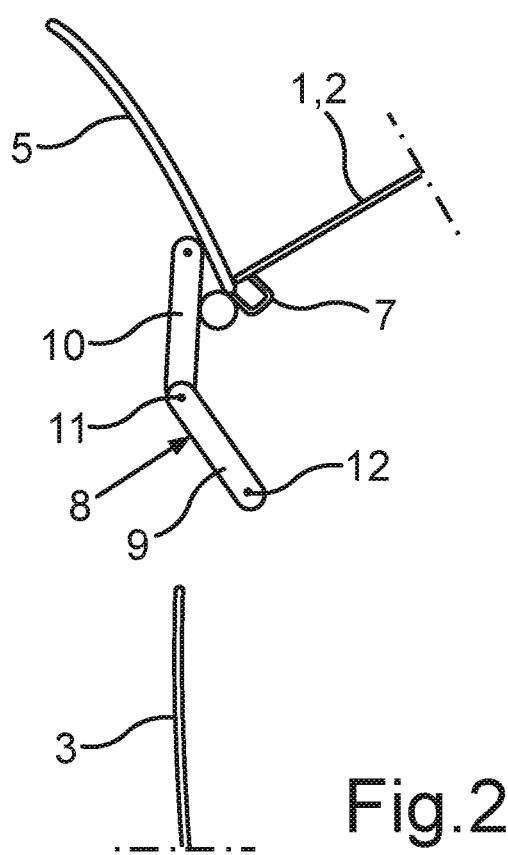
Fig.1
Fig.2

LOCKING APPARATUS FOR COVERING AND RELEASING A CHARGING INTERFACE OF A MOTOR VEHICLE AND MOTOR VEHICLE

FIELD

The invention relates to a locking apparatus for covering and releasing a charging interface of a motor vehicle by means of a cover element which can be pivoted relative to the charging interface. The invention further relates to a motor vehicle provided with such a locking apparatus.

BACKGROUND

With the increasing use of electric and hybrid motor vehicles, as well as of corresponding charging stations, safety consideration are also becoming increasingly important when charging while traveling and under adverse conditions. This is particularly relevant in view of increasing charging voltages and charging capacities. Particularly important is in this case the protection of a connection point between the respective charging station and the vehicle to be charged against moisture and foreign objects, as well as against mechanical influences or damage.

A charging device for a motor vehicle is known from DE 10 2010 053 137 A1. In this case, a charging socket is arranged in an opening of the car body, wherein the car body opening can be covered with a locking apparatus. The charging socket is in this case pivotable in the axial direction of the car body opening, so that and opening of the closing device causes a displacement of the charging socket. The locking apparatus can comprise a mechanically supported cover, which can be accommodated in an open state in a receiving recess. If a charging plug is connected to the charging socket, the charging interface be in an open or partially open state, wherein the charging plug can be covered by an upper cover part against environmental influences such as rain or snow.
10/9/2017 7:33:00 PM FR 2998 102 describes an electrical socket for electric vehicles that is provided for receiving a charging plug. In this case, a protective flap can occupy two operating positions, one of which provides access to the socket and enables connecting the charging plug, while the other operating position prevents direct access to the socket and to the charging plug. A connecting part, which is connected to the charging plug, can therefore be pivoted relative to a housing.

DE 198 32 910 C2 describes a locking apparatus for an opening for filling a motor vehicle tank, which comprises a tank cover that is cooperating with the filling opening. At the same time, a locking slide is located on the upper side of the tank cover.

SUMMARY

The object of the present invention is to enable a particularly comfortable and safe charging of a motor vehicle or of an energy storage device of a motor vehicle via a vehicle-external charging cable.

This object is achieved with a locking apparatus and a motor vehicle according to the independent patent claims. Advantageous embodiments of the invention are described in the dependent patent claims, as well as in the following description and in the figures.

The locking apparatus for covering and releasing a charging interface according to the invention comprises a cover element, which is pivotable relative to a stationary component of the charging interface and thus also relative charging interface. The cover element can be adjusted to cover the charging interface in a closed position, and to release the charging interface in an open portion. In order to enable a particularly safe and comfortable charging of the motor vehicle via a charging cable that is connected or can be connected to the charging interface, the closing device is according to this invention provided with a flexible connection element. This flexible connection element is connected in an upper end region of the cover element along the transverse extent of the cover element to this cover element. The upper end region is in this case arranged in the vehicle mounting position, namely as the mounted position of the locking apparatus or of the cover element in the upper part in the vehicle direction. In the mounted position according to the invention, the cover element is then coupled in a permanent manner and in any position of the cover element to protect the charging interface from foreign objects falling on it or from other incident elements impacting the component, relative to which the cover element can be pivoted.

Under foreign objects can be in this case understood for example items such as objects, dirt and dust, but weather conditions such as rain and snow also included. In other words, the flexible connection element is used as a seal or functions in this manner by providing a seal. Although the connection element is connected with the cover element along the transverse extent of the cover element, this does not necessarily mean that the connection element is on a horizontal, straight or a rectilinear level, since it can be also provided with an arcuate or curved and/or sections of a rectilinear course. This can be in particular the case when the cover element is provided with a rounded shape on one side. With the connection or attachment of the connection element along the transverse extent, which is to say at least substantially in transverse direction to the direction of the vehicle, a particularly simple and permanent or permanently stable arrangement can be realized, by means of which a seal or protection of the charging interface can be realized with the connection element independently of the position of the cover element. In this case, the cover element can be in particular pivotable about a pivot axis extending parallel to the transverse extent. The stationary component, which is located on the opposite side relative to the charging interface, can be for example a frame part or a housing part of the charging interface surrounding at least partially the interface, or a locking apparatus, but it can also be for example a car body part of the motor vehicle.

Since the sealing connection element is provided and designed to be or to become firmly connected on both sides, which is to say on the one hand to the cover element, and on the other hand to the structural component, an advantage is that no additional force is in particular required to produce a tight seal. For example, two parts of a conventional seal must be combined together to create a force-locked connection, which can be the case with conventional seals when a sealing lip is inserted into a sealing groove.

Furthermore, thanks to the flexible connection element and its permanently fixed connection, protection of the elements is ensured at any time and independently of the occupancy status and connection status of the charging interface. This is particularly advantageous in view of the fact that the cover element cannot in this case for example slip out of the seal provided to protect against potential contamination, so that there are no potentially unsealed boundary surfaces or boundary lines, wherein the cover element and the sealing element could be positioned against each other without in fact being connected to each other in a fixed manner. With the arrangement of the connection element in the upper region of the cover element, the cover element can be pivoted in a particularly advantageous manner for opening it upward in the motor vehicle direction and as a result, it thus provides a further protection against incident or striking foreign bodies or influences thereof. A particularly good protection of the charging interface can thus be achieved with the interaction between the cover element and the connection element.

The flexible connection element can be formed for example from an elastomeric or from another material, in particular a flexible and/or elastic material. It can be advantageous for improved stability, durability and/or weather resistance to form the flexible connection element from several components or component parts. For example, a multi-layered material or a laminate can be used. For improved sealing characteristics, the connection element can comprise for example a metallic foil. The type of the fixed connection of the connection element used with the cover element and/to the structural part can be selected depending on the respective materials. It is thus possible to use for example an adhesive, or a welded connection can be used.

The upper end region of the cover element in which the connection element is fastened does not need in this case to be a visibly separate or distinguishable region of the cover element; instead, it can comprise for example the upper third of the cover element. For example, the connection element can here connected for example with a disc type of form of the cover element at a large side surface of the cover element to the cover element, so that a particularly large surface and thus also a durable and stable connection can be realized. However, it can be also provided that the connection element is connected at an edge and/or at a narrow side, or at a peripheral side to the cover element, wherein a particularly space-saving arrangement or design can be advantageously realized. In addition, this also makes it possible to prevent rain water from penetrating behind the cover element, or one of the inner sides or inner surfaces of the cover element facing the charging interface.

It is particularly preferred when the connection element, which is connected in the required mounting position on the inner side of the cover element facing the charging interface, is connected with the cover element and designed for a locking position at least on the inner side of arrangement on the outer contour of the vehicle. In other words, the connection element then protrudes into the mounting position of the locking apparatus as intended and while the cover element is located in its locking position, it does not protrude beyond the outer contour of the vehicle. The outer contour of the vehicle can in this case be formed for example by the cover element and by the car body parts surrounding the cover element. Such an arrangement of the connection element is advantageous for protection against damage, in particular damage that is due to mechanical influences. In addition, such a permanent sealing or permanent protection of the charging interface can be realized without exerting an influence on the design and/or without having a negative influence on the air resistance of the motor vehicle. The connection element can be for example connected on the side facing away from the cover element with the cover element, for example on the inner side of a vehicle body part.

It is particularly preferred when the connection element is formed, at least in a sections or in a region, with a channel extended at an angle to the vehicle in the orientation direction of the vehicle. This channel can be preferably open in the upward direction. In other words, the connection element can be designed to receive for example water falling or running from above and channel it off in the transverse direction. The extension of the channel perpendicularly to the vehicle direction thus only applies to the main extension of the channel. It should not be excluded that the channel is provided with a curved and/or inclined course, in particular with respect to the orientation of the vehicle. In this manner, the water that is received in the channel can be conducted away particularly efficiently and for example on the side of the charging interface, or it can be conducted away from a recess in the vehicle body accommodating the charging interface. The channel can be in this case formed easily and without an additional expense due to the flexibility of the connection element. However, the channel can be also formed so as to provide a structure corresponding to the connection element in order to ensure that the connection element is in the mounting position provided with a safe and suitable design.

Also, due to the flexibility of the connection element, the channel can be provided with a variable or changeable cross-section when the cover element is adjusted. This cross-section can have for example a shell-like shape, which is open upward, in particular in the direction of the orientation of the vehicle. It may be also possible that the connection element is formed from several segments, so that the cross-section of the channel can then be formed or constructed for example in part from rectilinear segments.

In another embodiment of the present invention, it is provided that the cover element is additionally displaceable so that it can be moved from the closed position and from the open position to various protective positions in which the charging interface is protected by the cover element, and so that the connection element can then be protected from foreign objects falling on it when charging is performed with a plug that is external to the vehicle, which is then covered at least partially by the cover element and which is electrically connected to the charging element. The protective position is thus located between the closed position and the open position, so that for example when the cover element is pivoted from the closed position to the open position, the pivoting runs through this position. It can be for example also provided that the cover element is at first moved from the closed position into the open position, which can be characterized for example by a maximum adjustment angle or opening angle of the cover element. The charging interface is not covered in the open position of the cover element, so that a particularly simple and comfortable connection can be established by plugging in the charging plug into the charging interface. As soon as the charging plug is connected to the charging interface, the cover element can be pivoted from the open position in the direction of the closed position all the way to the protective position.

It is particularly preferred when during the displacement of the cover element from the closed position to the open position, a horizontal position or a position parallel to the floor of the motor vehicle is exceeded or passed through. This is because a particularly large opening angle is ensured in this manner, by means of which the charging interface becomes accessible in a particularly simple manner. When the cover element is moved from the open position into the protective position, it is particularly preferred when it also passes through the horizontal position, or a position that is parallel to the floor of the motor vehicle—however, in this case in the opposite direction. This makes it possible to ensure in a simple manner that the foreign objects impacting the cover element from above are in the protective position guided away and thus moved away from the charging interface. In the protective position it is also advantageous when the charging plug is protected by the cover element and the connection element is also protected. It is thus possible to prevent in an advantageous manner the charging plug from becoming wet and/or contaminated, in particular at the handle of the charging plug, as a result of which the handling of the charging plug becomes more comfortable and safer. For example, the best possible handling safety is thus ensured at all times, and there is no risk that for example leakage currents could propagate via a water film from the charging interface or from a contact point of the charging plug up to the grip which is covered by the cover element.

In another embodiment of the present invention it is provided that in the protective position, when the charging plug is electrically connected to the charging interface, the charging plug is protected by the cover element against being removed from the charging interface. It is further also provided that the locking apparatus is equipped with an adjustment sensor for detecting a displacement of the cover element from the protective position and is adapted to generate a control signal in order to interrupt a charging operation in the case of such a displacement. This means that in this case, the cover element must be first moved out of the protective position before the charging plug can be removed or disconnected. This can be realized by means of a corresponding design of the cover element and/or with a suitable design selection, as well as with the setting or presetting of the protective position. In particular, it can be provided that the cover element must first be moved from the protective position into the open position, or at least in the direction of the open position.

The cover element or a movement of the cover element can be monitored by means of an adjustment or displacement sensor. Such monitoring can be in particular provided or activated when the cover element is located in the protective position. It is also possible to detect when the cover element is moved from the protective position. The monitoring can be in this case activated for example with a movement of the cover element to the protective position and/or when the charging plug is connected to the charging interface.

The control signal can be used to make sure that a potential active or currently conducted charging operation will be interrupted as soon as it is detected, and that the cover element will be moved out of the protective position. Because prior to removing the charging plug it is necessary to open or adjust the cover element, there is always sufficient time available to ensure that there is no current and/or voltage applied to the charging plug and the charging interface. This can be also used to prevent in an advantageous manner that an electric arc will not be formed during the removal or unplugging of the charging plug, which could under some circumstances cause significant material damages and/or injuries to persons.

The control signal can be for example provided for or transmitted to a charging control device of the motor vehicle.

In another embodiment of the present invention it is provided that the locking apparatus is equipped with a lever mechanism that is coupled to the cover element, so that the cover element can be adjusted only in interaction with the lever mechanism. The lever mechanism comprises in this case at least two lever arms that are mutually connected to each other by means of a joint. It is particularly advantageous in this case when the lever mechanism is arranged and designed such that if in the closed position of the cover element, a dead point position is reached between the open position and the closed position, the dead point of the closed position is passed through. In other words, the lever mechanism is provided with a dead point or with a dead point position so that when the cover element is moved from the open position into the closed position, this dead point is not only reached, but passed through. The lever position will thus be in the closed position also in a point that is beyond the dead point. This can be used to prevent in an advantageous manner that the cover element could become opened with simple pulling.

This can also prevent unauthorized access to the charging interface. Since the dead point is not only reached but also passed through or exceeded, this makes it possible to prevent in a particularly advantageous manner the possibility that the lever mechanism could reach a position in which a simple opening of the cover element from would become possible, for example as a result of vibration occurring during the operations of the motor vehicle.

Specifically, it can be for example provided that a first lever arm of the lever mechanism is connected on one side via a joint to a second lever arm, while it is movably mounted on the other or opposite side on a axle or a shaft that is stationary relative to the charging interface. In this case, the stationary axle or shaft can be arranged in the closed position of the cover element with respect to a projection in the direction of the vehicle between the cover element and the joint connecting both lever arms. On the other hand, in the open position, this joint can be moved past the stationary axis or shaft by a corresponding element of the lever mechanism and then arranged between the axle and the cover element.

It is preferred when an emergency unlocking or overriding mechanism is provided, by means of which the lever mechanism can be moved by hand or manually also in the direction of the cover element past the dead point, for example by pulling, so that the cover element can even then still remain open. For this purpose, for example an access opening for the access to the lever mechanism can be provided, which makes it possible to move the lever mechanism with a corresponding tool beyond the dead point. At the same time, it is preferred when the access point is designed and/or arranged in such a way that it is not possible to reach the lever mechanism without a tool or an auxiliary means. Additionally or alternatively, for example an unlocking mechanism can be connected to the lever mechanism and guide, for example to a location that it is accessible in the interior of the motor vehicle. The unlocking mechanism can comprise for example a rod, a cable, a Bowden cable or the like. It is preferred when this unlocking element is accessible only when the motor vehicle is also unlocked in order to prevent an unauthorized person from having access to the charging interface.

It can be also provided that an actuation of the emergency unlocking or overriding mechanism causes a control signal to be output in order to interrupt the charging operation. A corresponding locking sensor can be provided for this purpose. Similarly, an emergency unlocking of the charging plug or of the connection of the charging plug can be provided with an interface. An activation of this emergency unlocking can also cause the generation of the control signal for interrupting the charging operation.

It is particularly preferred when locking apparatus is provided in another embodiment of the present invention with a drive that is mechanically connected with an operative connection to the lever mechanism. The drive can comprise for example an electric motor, so that the drive shaft of which is stationary relative to the charging interface and movably connected or coupled to the first lever arm. However, as an alternative, the drive shaft of the electric motor can be also coupled to this stationary shaft, for example by means of a gear, a spur gear stage, or the like. In this case it can be provided that the locking apparatus is designed to move upon detecting the connection of the vehicle-external charging plug that is detected by means of a corresponding charging plug sensor system to the cover element and the lever mechanism in the protective position. In other words, the cover element is placed or moved without any other measures or without any handling by an operator independently or automatically from its respective location or position, in particular from an open position into the protective position, as soon as the charging plug is connected to the charging interface. At the same time, however, it is also possible that a predetermined waiting period may be provided between connecting or plugging in the charging plug and the displacement of the cover element. This then makes it possible for example to give the operator enough time to leave the region of the pivoting of the cover element. The automatic movement of the cover element to the protective position makes it possible to ensure in an advantageous manner that the cover element and the connection element will be protected against external influences in the best possible manner. For example, this protection can then not be influenced by the fact that the operator has forgotten to move the cover element manually into the protective position.

It can be also possible that the cover element is moved or adjusted with the actuation of the emergency unlocking or overriding mechanism and/or of the emergency unlocking automatically by means of the drive from the protective position—for example into the open position.

It is also possible that the locking apparatus may be provided with a locking mechanism by means of which the cover element can be locked in the protective position. The cover element can be for example independently or automatically locked in the protective position, so that after that, a charging plug connected to the charging interface is moved by means of the drive to the protective position. It is then also possible to interrupt the charging operation when the cover element is unlocked by means of the corresponding emergency unlocking or overriding mechanism. Overall, this makes it possible to ensure in an advantageous manner that the cover element will not be unintentionally moved from the protective position during an active charging operation, and that the charging plug cannot be easily removed during the charging process from the charging interface, and that in case of an emergency unlocking or of an unplanned interruption of the charging process and/or a removal of the charging plug, this can be done without the application of current and/or voltage. The additional monitoring of the cover element or of the position of the cover element is also effective as a double or as an additional and independent protection against potential damage that can be caused by electricity.

In a further embodiment of the invention it is provided that the cover element is equipped with at least one lateral element by means of which the charging interface is protected against foreign objects falling on it or influencing in transverse direction to the vehicle direction, in particular as long as the cover element is arranged outside of the closed position. Without the at least one lateral element, when the cover element is moved out of closed position and a lateral opening is thus created between the cover element and the car body or a vehicle part, the charging interface and/or a cover element is covered or surrounded in the closed recess, and the closed receiving opening is thus released.

As a result, foreign objects incident in the lateral direction could thus reach the charging interface between the cover element and the vehicle part. This is effectively prevented by at least on lateral part. It is in this case preferred when a lateral element is arranged respectively on each side of the cover element so that the cover element provides protection with the two lateral elements, namely the charging interface from the front, from the top, from the left and from the right with respect to a viewing direction from the outside of the charging interface. The cover element thus forms with both lateral elements a type of protective hood over the charging interface and/or over a recess that receives a charging interface.

The lateral elements are in this case preferably dimensioned in such a way that they reach at least in the protective position of the cover element up to the vehicle part of the rest of the vehicle. It is preferred when corresponding receiving regions, receiving slots or recesses can be provided on both sides of the charging interface, in which the lateral element are accommodated when the cover element is in the closed position. The lateral elements can be designed as rigid elements, so that a particularly stable and reliable protection can be realized. However, the receiving element can be also realized as flexible and/or for example foldable elements, so that a space-saving accommodation of the lateral elements may thus be realized in the closed position. It is also possible to use a folding or pivoting mechanism by means of the lateral elements can be folded in when the cover element is in the closed position, so that they can be then arranged for example at the inner side of the cover element that is facing a charging interface.

In a further embodiment of the present invention it is provided that the locking apparatus comprises a illumination device and the cover element is designed, at least in some regions and at least partially, to be permeable to the light for that is generated with the design of the illumination device. It is thus possible to provide by means of the illumination device light for searching, preferably with white light, and/or functional light or lighting, preferably in a plurality of colors for different indication of functions or conditions. The searchlight function can be used for illuminating the charging interface and operating elements that may be also present, in order to make it easy for the operator to perform operations such as plugging in or connecting the charging plug to the charging interface. Indication regarding for example the charging state can thus be provided with the functional lighting in a particularly simply manner, which can be recognized quickly and intuitively. For example, a low charging status can be indicated by a red light, a high charging status can be indicated by a green light and/or the charging activity can be indicated with flashing or with intermittent illumination.

Since the charging interface is advantageously covered, at least partially, by the cover element to provide protection in particular during the charging process, the transparency to light of the cover element provided according to the invention is particularly advantageous and useful, because the functional illumination of the cover element can be seen by the respective operator from outside even if it is arranged for example in the cover. An at least partial light transmittance in this case means that the corresponding region of the cover element is fully transparent or translucent, in particular because it is designed to be translucent. In this case, the cover element can be designed to be fully transparent or translucent to enable visibility of the illumination which can thus be seen from as great a viewing angle as possible. However, it may be also possible to create a design, for example from specific design reasons or cost reasons, wherein only one or several partial regions of the cover element are visible.

The illumination can comprise a plurality of light sources, which can respectively consist for example of a plurality of LEDs. Each or several light sources can in this case be arranged at an inner side of the cover element facing the charging interface and/or next to the charging interface. However, it is also possible that additionally or as an alternative, the illumination device comprises one or a plurality of light guides, or is formed by these light guides. With the light guide or light guides, the light that is used for illumination with a light source arranged at a distance from the locking apparatus, can be in particular guided to the cover element. This makes it possible to achieve in an advantageous manner space savings in the area of the locking apparatus. Furthermore, since it is then advantageously not necessary to have any electric illumination components arranged in the area of the flap of the charging device, or in the area of the locking apparatus, the risk of damage leading to a failure of the illumination device is thus also reduced—whether due to weather influences resulting from an exposed position at the cover element, or due to mechanical influences, such as due to the impacts that are caused by the charging plug when it is plugged in or removed.

A motor vehicle according to the invention is provided with a charging interface and with a locking apparatus according to the invention.

It is preferred when the motor vehicle according to the invention is further provided with an operating element which has a detection region that at least partially exceeds or overlaps the pivoting region, or projects into the pivoting region. The operating element is in this case preferably designed for direct manual operation and for an indirect operation, which is provided with the application of force and/or pressure. Furthermore, the operating element according to the invention is adapted to generate an electric control signal during its operation or operations. The pivoting region of the cover element comprises the region that is traversed or will be traversed by the cover element when it is adjusted.

The control element may be provided, for example as a push button, in an operating location. The operating element can be in particular provided as a micro switch, as a capacitive, inductive and/or a piezoelectric sensor, or the like. The operating element can be arranged for example on the inner side of the cover element. This means that that the operating element can be covered by the cover element when the cover element is located in its closed position. In this case, the operating element itself can be also arranged at the cover element, or fastened to it, or integrated in the cover element, but it can also be fastened to or arranged at another part of the locking apparatus, or attached to another component of the motor vehicle that is stationary relative to the charging interface.

If the cover element is in the closed position, the operating element can be operated or actuated for example by applying pressure to the cover element from outside, which is transmitted through the cover element. On the other hand, if the cover element is for example in its open position, the operating element can be also operated directly by an operator, for example with a finger.

It is advantageous when generation of the electric signal by the operating element can be used to control the locking apparatus, for example in order to move the cover element which is provided with the drive for the cover element. In this manner, the cover element can be opened and/or closed in a particularly simple and comfortable manner with the corresponding operation of the operating element. The locking apparatus can be in this case for example provided with a push-push mechanism for the cover element and/or with a push-to-run function. The cover element can be thus opened in a particularly simple and comfortable manner by exerting pressure on the cover element which is arranged in the closed position, and it can be closed by tapping on or pushing the cover element when it is arranged in the open position to move it in the direction of the closed position of the cover element.

Alternatively or in addition, the operating element can be also provided or configured with other control functions. For example, it may be possible to lock and/or unlock the charging interface via the operating element. It may be also possible that the illumination device can be also controlled, if it is provided. It may be also possible that in addition to the operating element, a display device is provided which can be also controlled via the operating element. For example, it may be possible that when the operating element is activated, information about the respective charging state and/or about the charging process in progress can be called up, so that this information is for example shown on the display device. The display device can be for this purpose provided with a screen which can be for example integrated in the cover element, or next to the cover element, or next to the charging interface.

The embodiment of the locking apparatus and of the motor vehicle according to the invention described so far and in the following, as well as the respective corresponding advantages are mutually interchangeable and transferable, at least mutatis mutandis, according to the locking apparatus and the motor vehicle according to the invention.

The invention also includes further embodiments of the motor vehicle of this invention, which are provided with features that were already described within the context of further embodiments of the locking apparatus according to the invention. For this reason, the corresponding further embodiments of the motor vehicle will not be described again here.

BRIEF DESCRIPTION

Figure 4:
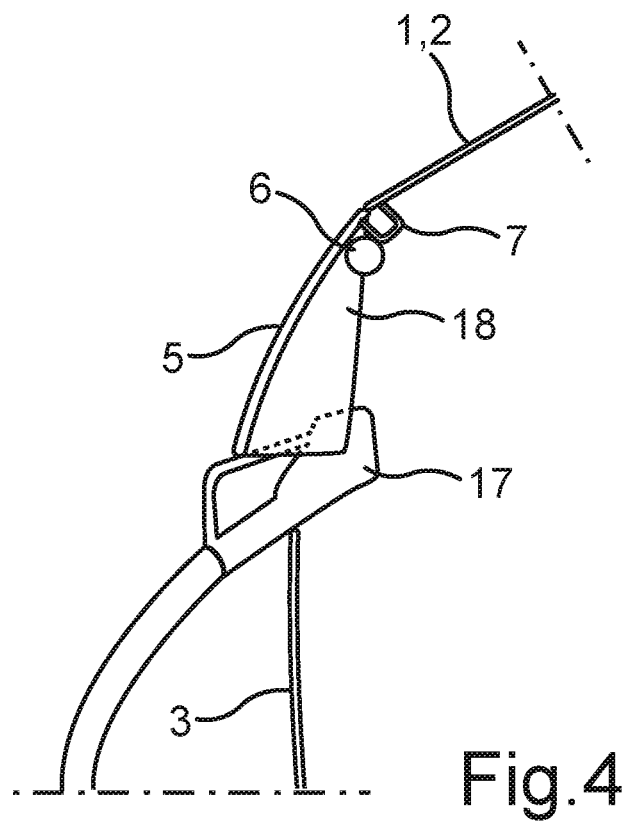

Other features, details and advantages of the invention will become evident from the following description of preferred embodiment of the invention, as well as from the figures which illustrate preferred embodiments. The figures show the following:

FIG. 1 a schematic and in part sectional lateral view of a locking apparatus arranged at a motor vehicle in closed position:

FIG. 2 a schematic view, in part in a sectional and in part in a schematic form, of the locking apparatus of FIG. 1 in open position;

FIG. 3 a schematic and in part sectional lateral view of an alternative embodiment of a locking apparatus arranged at a motor vehicle; and FIG. 4 a schematic sectional lateral view of a third locking apparatus in a protective position, in which the charging plug is at least partially covered by the locking apparatus.

DETAILED DESCRIPTION

The embodiments described in the following are preferred embodiments of the invention. The components described in the respective embodiments represent individual features of the invention, which should be considered independently of each other, and each of which also further develops the invention independently of each other, and also individually or in a combination other than the combination shown as a part of the invention. Furthermore, the described embodiments can be also complemented by other, already described features of the invention.

Elements which are functionally equivalents are provided with the same reference symbols in the figures.

FIG. 1 shows a schematic, partial and lateral view of a part of motor vehicle 1, of which is here represented here only an upper car body part 2 and a lower car body part 3. Between both car body part 2, 3 is illustrated, again in a schematic and sectional manner, a locking apparatus 4. The locking apparatus 4 comprises a cover element 5, which can be also referred to a as charging flap. The cover element 5 is in this case used to cover or bridge over the car body opening between both car body parts 2, 3. Although it cannot be seen here, the motor vehicle 1 is preferably an electric vehicle or a hybrid vehicle, wherein the car body opening that is covered by the covering element 5 then makes it possible to access a charging interface—also not shown here—of the motor vehicle 1. The cover element 5 is for this purpose mounted about a pivot axle 6, also not shown here. In the present case, the cover element 5 is shown in a closed position, in which it forms together with car body parts 2, 3 up to the gap dimensions, a continuous outer contour of the motor vehicle 1. Other possible positions of the cover element 5 are explained in connection with other figures.

The flaps corresponding to the cover element 5 in the case of conventional locking apparatus are due to their necessary folding ability or pivoting ability of the component parts that are separate from the respective car body parts surrounding the flap. A gap or a distance is thus defined in particular between the respective flap and the corresponding upper car body part, through which foreign objects, dirt, rain water and the like can penetrate inside and thus reach the respective charging interface. In order to prevent this, it is in the present case provided that the cover element 5 is permanently coupled by means of a flexible connection element 7 to the upper car body part 2. The connection element 7 is thus connected in a fixed and permanent manner to the cover element 5 and to the car body part 2.

Despite the fixed connection of the connection element 7 to the cover element 5 and the upper car body part 2, due to the flexible design of the connection element 7, the pivoting ability of the cover element is not hindered. The flexible connection element 7 thus makes it possible to protect the charging interface independently of the position or arrangement of the cover element 5 permanently and reliably from objects falling down on it, or from encountered foreign objects, for which purposes the connection element is provided with a watertight and waterproof design.

For a design that is as space-saving as possible, it is possible that in this case, the connection element 7 is fastened at the top end in the direction of the orientation of the motor vehicle. This therefore means that the access to the charging interface of the open cover element 5 is not unnecessarily limited by the connection element 7. The pivot axle 6 is also arranged here in the upper end region of the cover element 5 and it is therefore advantageously protected against foreign objects and against penetrating moisture as a result of its positioning in the vehicle direction below the connecting element 7. As a result, the reliability of the pivoting mechanism is increased, as for example the lubricants provided on the pivoting axle 6 cannot be washed away.

It can be also clearly seen that the connection element 7 here forms a channel, which is open at the top in the direction of the orientation of the vehicle and through which for example water running in the downward or outward direction at the upper car body part 2 can be removed or discharged with the channel in a transverse direction to the vehicle direction along the channel, away from the cover element 5 and the charging interface. At the same time, the connection element 7 is arranged on the inner side of the vehicle contour so that it can be protected against mechanical influences and damage.

In order to pivot the cover element 5, a lever mechanism 8 is also provided in addition to the pivot axle 6. This lever mechanism 8 is also arranged on the inner side of the cover element 5. In the present case, the lever mechanism 8 comprises a first lever arm 9 and a second lever arm 10, so that both are mutually movably coupled via a central joint 11. The motor shaft 12 can be for example a drive shaft of an electric motor, which is used to move or adjust the lever mechanism 8 and thus also the cover element 5.

The second lifting arm 10 is coupled at its end facing away from the central joint 11 via a movable bearing 13 to the cover element 5. This arrangement thus enables movement or displacement of the cover element 5 only in interaction with the lever mechanism 8. Therefore, this means that when the cover element 5 adjusted, the lever mechanism is also adjusted and vice versa.

The motor shaft 12 can be rotated by means of the electric motor in two opposing directions, indicated here by corresponding arrows. In the present case it is provided that the lever mechanism 8 has a dead point, so that when an attempt is made to open the cover element by pulling the cover, the corresponding force vector lies directly on a straight line with the central joint 11, so that no movement of the cover element 5 is possible. If the cover element is moved into the closed position illustrated here, this dead point is traversed or passed, and the cover element 5 will not be open in this case with simple pulling, which is to say that it can be moved from the closed position. For this purpose, a direct movement of the central joint 11 from the position illustrated here in the direction of the cover element 5 can be blocked or prevented for example by a blocking component, not shown here.

In the embodiment shown, the lever mechanism 8 is arranged in the closed position in a position above the dead point, which is located above the motor shaft 12 in the upper position in the direction of the vehicle. With a rotation of the motor shaft 12 in the opening direction 14, the center joint 11 is first moved downward in the in the direction of the orientation of the vehicle by means of the first lever arm 9, before it is then moved in the direction of the cover element 5. With a subsequent rotation of the motor shaft 12 in the closing position 15, the central joint 11, or the lever mechanism 8 is moved again in the opposite direction, namely again in the illustrated closed position. In this case, the cover element is also moved along in a corresponding manner because it is coupled via a movable bearing.

FIG. 2 shows in the same representation the arrangement of FIG. 1, wherein the cover element 5 is here illustrated in an open position.

In this case, the lever mechanism 8 is correspondingly extended and the access through the pivoted cover element 5 to the car body opening between the car body parts 2, 3 or to the charging interface that is located behind it or in it, is now released. In this position, a charging connector 17 (see FIG. 4) can be also connected to the charging interface.

FIG. 3 also shows in a schematic and sectional lateral view an alternative embodiment of the closing device 4. In this embodiment, the point of the lever mechanism 8 above the dead point is arranged in the closing position of the cover element in the vehicle direction, below the motor shaft 12. Accordingly, the opening direction 14 and the closing direction 15 are also opposite to the embodiment shown in FIG. 1. In addition, an operating element 16 is provided here, which, however, is not connected to the cover element 5. Instead, the operating element 16 is fixed on the side of the motor vehicle. However, the cover element can reach to or be pivoted into a detection region or triggering region of the of the operating element 16. The operating element 16 can be for example designed as a micro switch or a push button, and it can be triggered when it comes into contact with the cover element 5, or when it is impacted by a force or pressure. In addition, a respective operator, not shown here, can apply pressure to the cover element 5 from outside.

An electric signal is generated by triggering the operating element 16, which can here be transmitted to the electric motor that is connected to the motor shaft 12. Accordingly, the cover element 5 can be moved or pivoted by triggering the operating element 16 of the cover element 5 by means of the electric motor. It may also be possible to provide a locking mechanism, not shown here, which can be locked and/or unlocked by actuating the operating element 16. If the cover element 5 is not in the closed position, the operating element can be also operated or triggered directly, for example when it is touched directly by the operating person. In that case, the cover element 5 can then be accordingly displaced for example to the closed position or also to another position—such as a protective position (see FIG. 4).

The operating element 16 can be of course provided and used also with other embodiments of the locking apparatus 4 than the one shown in FIG. 1, which are not illustrated here.

FIG. 4 also shows the motor vehicle 1 in a schematic and sectional lateral view, wherein, however, a third embodiment of the locking apparatus is provided. In this case, the cover element 5 comprises respective lateral elements 18, which protect or shield the charging interface also from foreign objects falling on it transversely to the vehicle direction, or against influences thereof when the cover element 5 is not arranged in the closed position. In the present case, the charging plug 17 is illustrated as being connected to the charging interface, so that the cover element 5 then cannot be arranged in the closed position because it would collide with the charging plug 17. In order to provide the best possible protection for the charging interface and for the charging plug 17, it is provided that also in this case, the cover element 5 can be arranged in the illustrated protective position in which the charging plug 17 is at least partially covered or concealed.

Although the lever mechanism 8 is not shown here for the sake of clarity, it can be of course also provided here. It is further particularly preferred also here when a sensor system, not shown, is provided, which detects a connection or connecting of the charging plug 17, and then independently causes the cover element to be automatically set into the protective position.

Overall, the illustrated embodiment show how the invention makes it possible to realize a reliable and permanent protection of a charging interface against weather and, if appropriate, protection of the charging plug that is connected to it with a corresponding design of a locking apparatus in order to enable particularly comfortable and secure charging of a motor vehicle with a corresponding charging cable.

The invention claimed is:

1. A locking apparatus for covering and releasing a charging interface of a motor vehicle, comprising:
    a cover element, which can be pivoted about a mounting position relative to a component that is stationary relative to the charging interface, the cover element capable of being moved to a closed position in order to cover the charging interface and moved to an open position in order to release the charging interface; and
    a flexible connection element, which is connected at an upper end region of the cover element, along the whole of the upper end region of the cover element, wherein:
    the cover element is sealingly coupled via the flexible connection element to the component so as to protect the charging interface from incident foreign material;
    the cover element can be additionally moved to a protective position that is different from the open position, in which the charging interface is protected by the cover element and the connection element can then be protected from incident foreign objects when a vehicle-external charging plug, which is at least partially covered by the cover element, is electrically connected to the charging interface; and
    in the protective position, when the charging plug is electrically connected to the charging interface, the charging plug is blocked by the cover element from being removed, and the locking apparatus is provided with a displacement sensor for detecting a displacement of the cover element from the protective position and generates a control signal for interrupting a charging operation.

2. The locking apparatus according to claim 1, wherein the flexible connection element is connected to an inner side of the cover element.

3. The locking apparatus according to claim 1, wherein the flexible connection element forms a channel which extends, at least in sections, transversely or at an angle to a vehicle direction.

4. The locking apparatus according to claim 1, wherein the locking apparatus is provided with a lever mechanism, which is coupled to the cover element in such a way that the cover element can be displaced only in interaction with the lever mechanism, wherein the lever mechanism includes at least two lever arms, mutually connected to each other by a joint, and wherein in the closed position of the cover element, a dead point position reached by the lever mechanism between the open position and the closed position of the cover element is traversed.

5. The locking apparatus according to claim 4, wherein the locking apparatus is provided with a drive, which is constantly in a mechanical connection with the lever mechanism and which is adapted to move the cover element by the lever mechanism to the protective position when a connection of the charging plug to the charging interface is detected by a corresponding sensor system.

6. The locking apparatus according to claim 1, wherein the cover element is provided with at least one lateral element, by which the charging interface is protected from contact with any incident foreign objects from a fore or aft direction relative to the vehicle while the cover element is arranged outside of the closed position.

7. The locking apparatus according to claim 1, wherein the locking apparatus includes an illumination device, and the cover element is at least in sections transparent to light with respect to the light that is emitted by the illumination device.

8. The locking apparatus according to claim 1, wherein the flexible connection element is arranged at least in the closed position on the inner side of an outer vehicle contour.

* * * * *